United States Patent
Tonshal et al.

(10) Patent No.: US 10,743,331 B2
(45) Date of Patent: Aug. 11, 2020

(54) METHOD AND APPARATUS FOR VEHICLE TO CLOUD NETWORK TRAFFIC SCHEDULING

(71) Applicant: FORD GLOBAL TECHNOLOGIES, LLC, Dearborn, MI (US)

(72) Inventors: Basavaraj Tonshal, Northville, MI (US); Oleg Yurievitch Gusikhin, Commerce Township, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 577 days.

(21) Appl. No.: 15/335,881

(22) Filed: Oct. 27, 2016

(65) Prior Publication Data

US 2018/0124805 A1 May 3, 2018

(51) Int. Cl.
*H04W 4/00* (2018.01)
*H04W 72/12* (2009.01)
*H04W 72/02* (2009.01)
*H04W 72/04* (2009.01)
*H04W 40/02* (2009.01)
*H04W 28/02* (2009.01)
*H04L 12/911* (2013.01)
*H04W 40/10* (2009.01)
*H04W 40/20* (2009.01)

(52) U.S. Cl.
CPC ....... *H04W 72/1205* (2013.01); *H04L 47/826* (2013.01); *H04W 28/0221* (2013.01); *H04W 28/0226* (2013.01); *H04W 40/026* (2013.01); *H04W 40/10* (2013.01); *H04W 40/20* (2013.01); *H04W 72/02* (2013.01); *H04W 72/048* (2013.01)

(58) Field of Classification Search
CPC . H04W 72/02; H04W 72/1205; H04W 40/20; H04W 72/048; H04W 72/12
See application file for complete search history.

(56) References Cited

U.S. PATENT DOCUMENTS

| | | | |
|---|---|---|---|
| 2005/0076336 A1* | 4/2005 | Cutrell | H04L 45/02 718/100 |
| 2008/0130627 A1* | 6/2008 | Chen | H04L 45/02 370/351 |
| 2008/0201074 A1* | 8/2008 | Bleckman | G01C 21/30 701/431 |
| 2010/0205292 A1* | 8/2010 | Diaz | H04L 12/40013 709/224 |
| 2012/0144057 A1* | 6/2012 | Meredith | H04L 63/0263 709/232 |

(Continued)

FOREIGN PATENT DOCUMENTS

WO 2015094043 A1 5/2015

*Primary Examiner* — Abdelillah Elmejjarmi
(74) *Attorney, Agent, or Firm* — Michael Spenner; Brooks Kushman P.C.

(57) ABSTRACT

A system includes a processor configured to receive a data transfer request including a data transfer constraint. The processor is also configured to receive a vehicle route. The processor is further configured to determine wireless network availability along the route based on known wireless network locations. Additionally, the processor is configured to determine a route window where wireless network availability indicates that a wireless network is available that meets the data transfer constraint and schedule data transfer to occur during the route window.

19 Claims, 6 Drawing Sheets

(56) References Cited

U.S. PATENT DOCUMENTS

| | | | |
|---|---|---|---|
| 2012/0331160 A1 | 12/2012 | Tremblay et al. | |
| 2013/0024107 A1* | 1/2013 | Xie | G01C 21/3461 |
| | | | 701/423 |
| 2013/0267237 A1* | 10/2013 | Kim | H04W 72/04 |
| | | | 455/450 |
| 2014/0244066 A1* | 8/2014 | Thanayankizil | G07C 5/008 |
| | | | 701/1 |
| 2015/0139010 A1* | 5/2015 | Jeong | H04W 48/14 |
| | | | 370/252 |
| 2015/0312344 A1* | 10/2015 | Anderton | G06Q 10/06 |
| | | | 709/203 |
| 2015/0351084 A1* | 12/2015 | Werb | H04W 4/70 |
| | | | 370/329 |

* cited by examiner

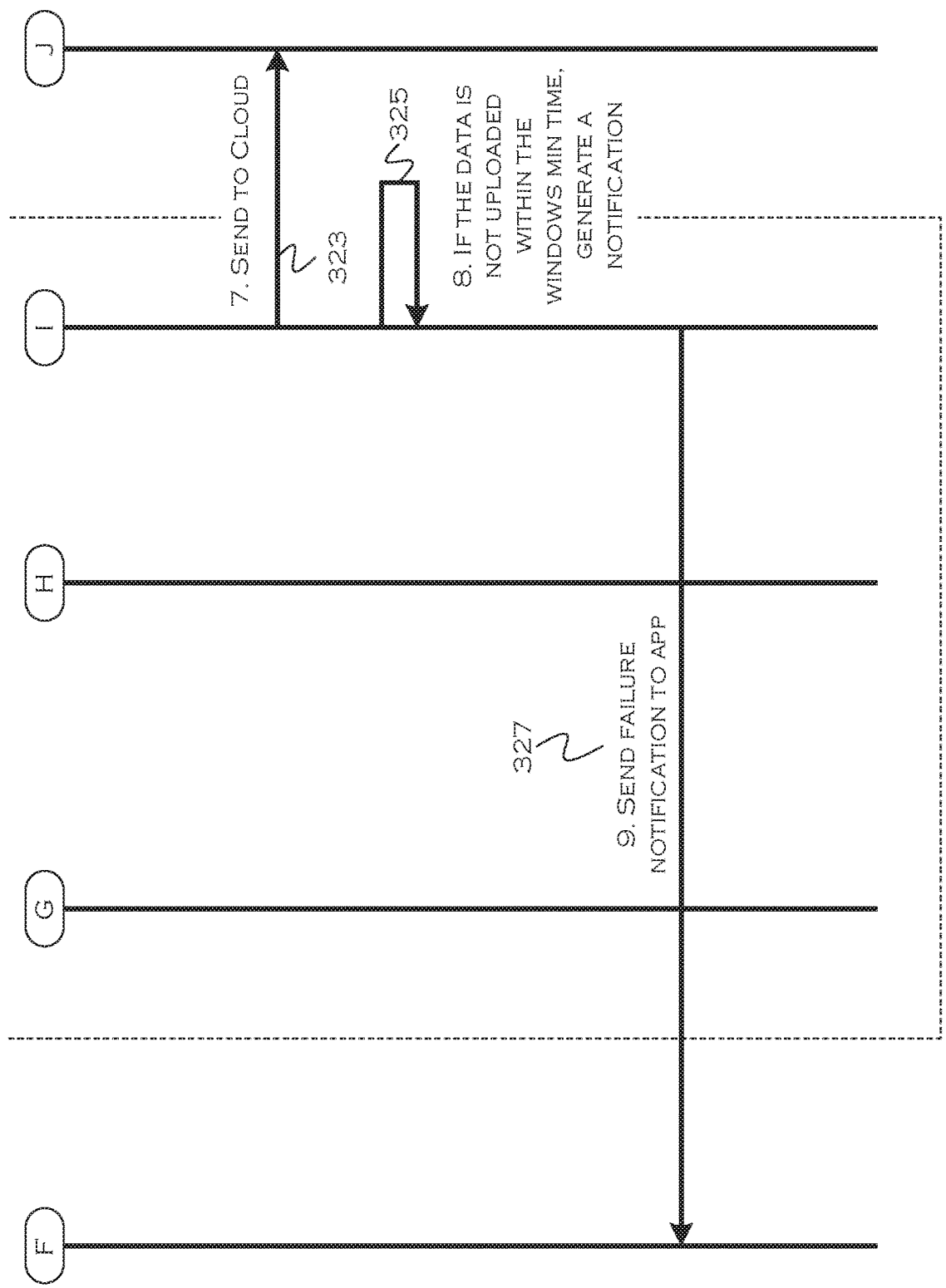

US 10,743,331 B2

METHOD AND APPARATUS FOR VEHICLE TO CLOUD NETWORK TRAFFIC SCHEDULING

TECHNICAL FIELD

The illustrative embodiments generally relate to a method and apparatus for vehicle to cloud network traffic scheduling.

BACKGROUND

Wireless communication has become a preferred form of data communication in the modern era. Whether it is a smart phone using a cellular connection to transfer data, or a laptop in a living room, tied into a wireless router, everyday wireless device use is almost a fact of life for an average citizen.

In most wireless environments, a user ties into a known source using an appropriately ranged form of communication. For example, a laptop user might use Wi-Fi or BLUETOOTH to obtain a remote data signal. A smart phone might use a longer range signal such as cellular, and if the laptop is using the smart phone as a mobile hotspot, then the combined data-provision system might use both local and long range wireless communication.

Vehicular mobile data services pose somewhat of a problem under this paradigm, because the vehicle tends to move at speeds that quickly bring the vehicle into and out of range of various available networks. The vehicle can even easily travel into areas of no cellular coverage, and even when cellular coverage is available, it may not be a preferred form of data communication.

If a vehicle owner wants to use a local Wi-Fi or other shorter-than-cellular-range signal for communication, the owner will likely need to keep a vehicle in somewhat close proximity to an access point, so that the signal is not lost due to distance. This severely limits the drivable range of a vehicle, however. It is also possible to only use a local Wi-Fi network when the vehicle simply happens to be in range, but such a model might result in frequent data loss or incomplete transfer, as the amount of the time the vehicle "happens to be in range" will often be quite a short period of time, unless the vehicle is parked.

SUMMARY

In a first illustrative embodiment, a system includes a processor configured to receive a data transfer request including a data transfer constraint. The processor is also configured to receive a vehicle route. The processor is further configured to determine wireless network availability along the route based on known wireless network locations. Additionally, the processor is configured to determine a route window where wireless network availability indicates that a wireless network is available that meets the data transfer constraint and schedule data transfer to occur during the route window.

In a second illustrative embodiment, a computer-implemented method includes determining the location of one or more known wireless networks overlapping a route, responsive to receipt of a data transfer instruction, including a data transfer constraint, and the route. The method also includes determining which of the one or more known wireless networks are usable to provide data transfer, according to the instruction, which also meets the data transfer constraint and scheduling data transfer to occur during a period at which a vehicle is projected to be within range, along the route, of at least one of the one or more known wireless networks determined to be usable to provide data transfer and meet the data transfer constraint.

In a third illustrative embodiment, a computer-implemented method includes determining the location range of a known wireless network overlapping a route, over which data transfer according to the instruction would also meet a data transfer constraint, responsive to receipt of the data transfer instruction, including the data transfer constraint, and the route. The method also includes determining if a designated primary sub-flow connection is likely to persist along the route beyond the location range, for sufficient time to complete a transfer if the transfer is not completed while the vehicle travels through the location range and scheduling data transfer to being when the vehicle reaches the location range, responsive to a determined likely persistence of the primary sub-flow connection.

BRIEF DESCRIPTION OF THE DRAWINGS

FIGS. 3A-3C show an illustrative example of a smart-scheduling process;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
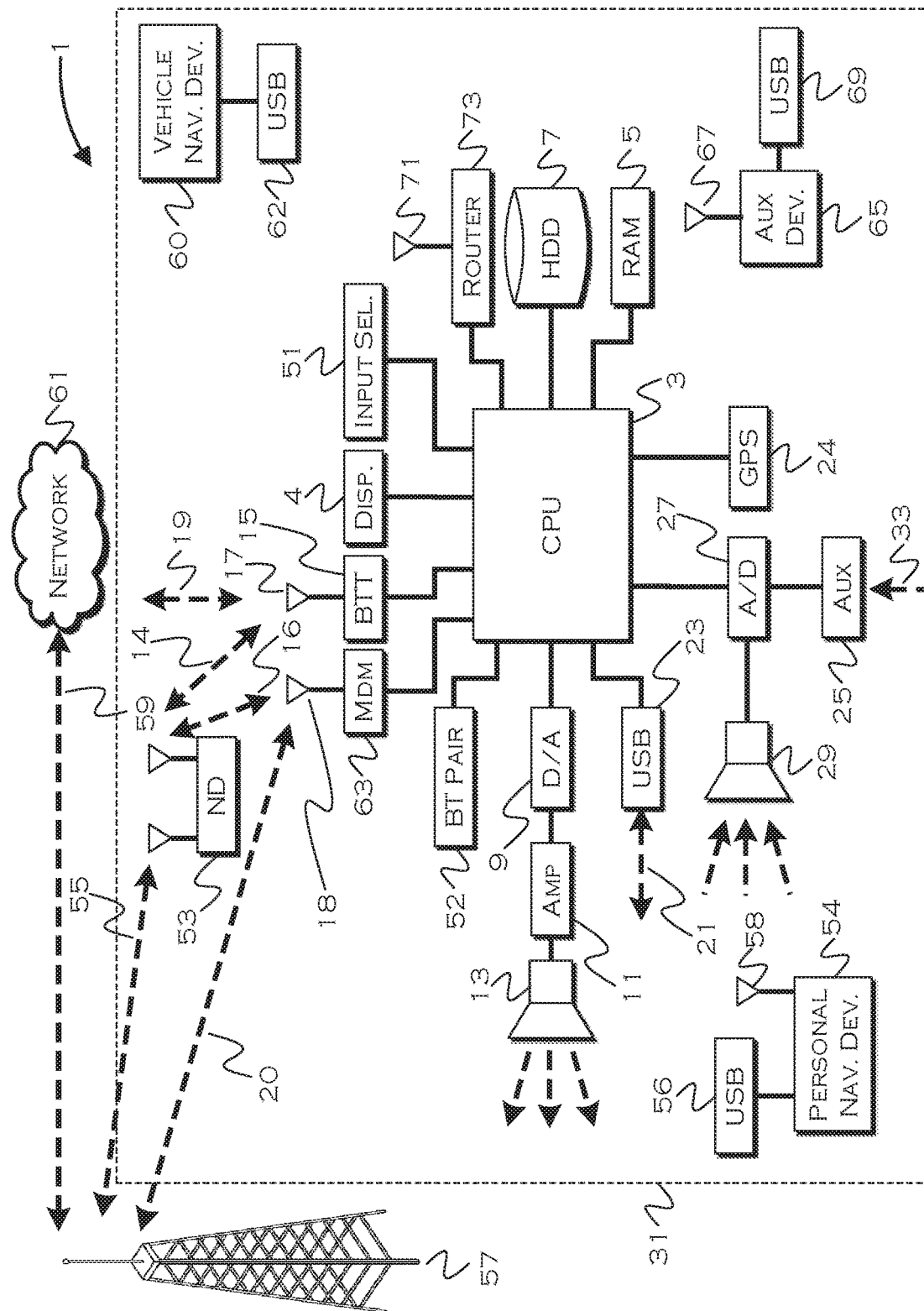
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

Vehicle owners and vehicle manufacturers might frequently prefer to use local, free, and high-speed wireless data connections if those connections could be provided in a reliable manner. This would be especially true if the vehicle remained in contact with a local network long enough to complete a data transfer, so that the entire transfer was not required to restart whenever a traveling vehicle broke contact with a local Wi-Fi network. Since it is not particularly reasonable to expect that a vehicle will remain in proximity to an access point for the duration of a data transfer, each time a data transfer is needed, the illustrative embodiments address the issue of network traffic scheduling when different network interfaces change availability states (in and out of range, public/private, free/cost, etc.).

To address the fact that vehicles frequently move in and out of contact with various networks, the illustrative embodiments provide a model whereby a persistent connection is established on a primary network sub-flow (such as cellular). The primary network sub-flow will be established on a network likely to persist regardless of vehicle location, or in most vehicle locations, and secondary sub-flows will be utilized to facilitate improved data transfer when available. Because at least some form of persistent connection is utilized, even if a secondary sub-flow is interrupted due to loss of signal, the entire transfer may slow down, but should not be lost.

The preceding can be accomplished using, for example, multipath TCP. Under this system, every time a network interface becomes active (provides the next hop), the vehicle does not have to tear down and build a new TCP connection. With the underlying support of this concept, network scheduling algorithms can utilize other network interfaces, such as Wi-Fi, along with a cellular primary sub-flow. In this manner, even if the Wi-Fi connection goes out of focus, the primary subflow can maintain the session, albeit in a possibly more limited manner.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

Figure 2:
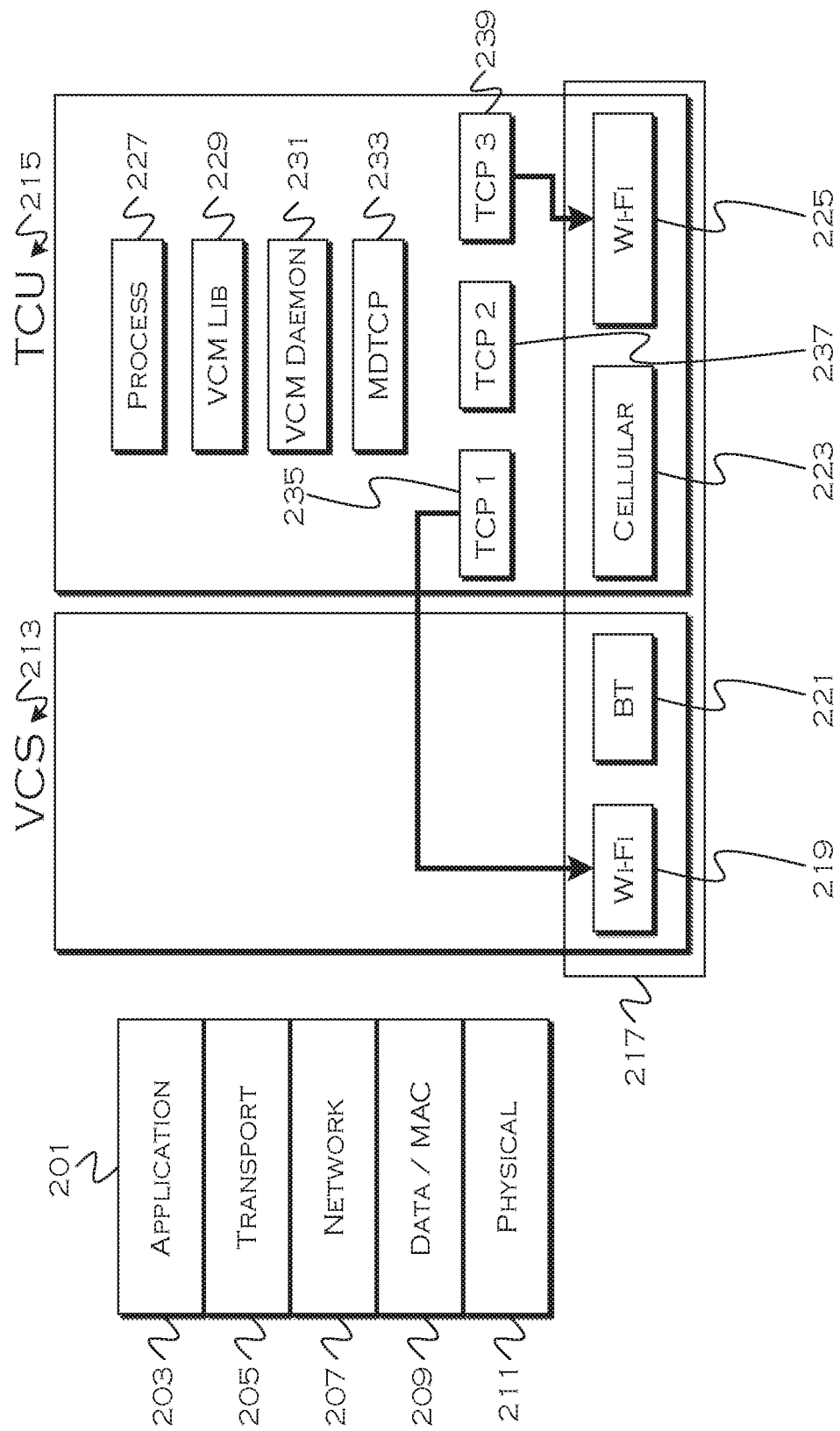
FIG. 2 shows an illustrative example of a layer architecture for an illustrative solution.

FIG. 2 shows an illustrative example of layer architecture for an illustrative solution. In this illustrative example, an application layer 203 of stack 201 sends or receives data from an off-board source. This application could be executing on the vehicle computer 213, on a vehicle ECU, such as the telematics control unit (TCU) 215 or on a mobile device using the vehicle for remote communication. In the latter instance, the mobile device is wired or wirelessly connected to the vehicle.

The figure element showing the vehicle computing system (VCS) 213 and TCU 215 shows two vehicle components (modules) capable of providing transport capability and application execution. In the example shown, the TCU module is executing an application utilizing transport. The application 227 includes an vehicle connectivity manager (VCM) module 229 and VCM Daemon 231.

The VCM library is a scheduling library that can schedule data uploads when a vehicle is predicted to be in range of a particular network resource usable to complete the data transaction. The scheduling module will work in concert with a connectivity manager to determine, based on a known or predicted route, when the vehicle will be in range (or out of range) of known network resources.

The transport layer 205 includes a multi-path transmission control protocol socket (MPTCP) 233, which is capable of using multiple transmission control protocols 235, 237, 239 to transmit data. In this example, the available transmission control protocols correspond to a vehicle Wi-Fi connection 219, an onboard modem cellular connection 223, and a TCU Wi-Fi connection 225. The BLUETOOTH connection 221 is currently unused or unavailable, in the example shown.

The various available TCP facilitating modules (VCS Wi-Fi, TCU Wi-Fi and TCU Cellular) all provide access to remote network resources, which include the network 207 and data/MAC 209 layers of the stack. As the vehicle moves, one or both Wi-Fi connections may become unavailable, but the cellular connection will typically persist at most locations. Accordingly, the vehicle may schedule a transfer when the connectivity manager indicates that the vehicle will be in communication range of known Wi-Fi access points (APs), and then if the vehicle moves out of range of those points before the transfer is complete, the process may continue to complete the transfer using the persistent cellular connection (the primary sub-net, in this and most cases).

It is possible that a connection other than the cellular modem is designated as a primary sub-net. For example, if a vehicle was an on-site vehicle, that was only driven in a localized range of coordinate (such as around a plant) where Wi-Fi was consistently available, the Wi-Fi connection might be the primary sub-net, since the connectivity manager might "know" that Wi-Fi was almost constantly available to that particular vehicle.

Figure 3A:
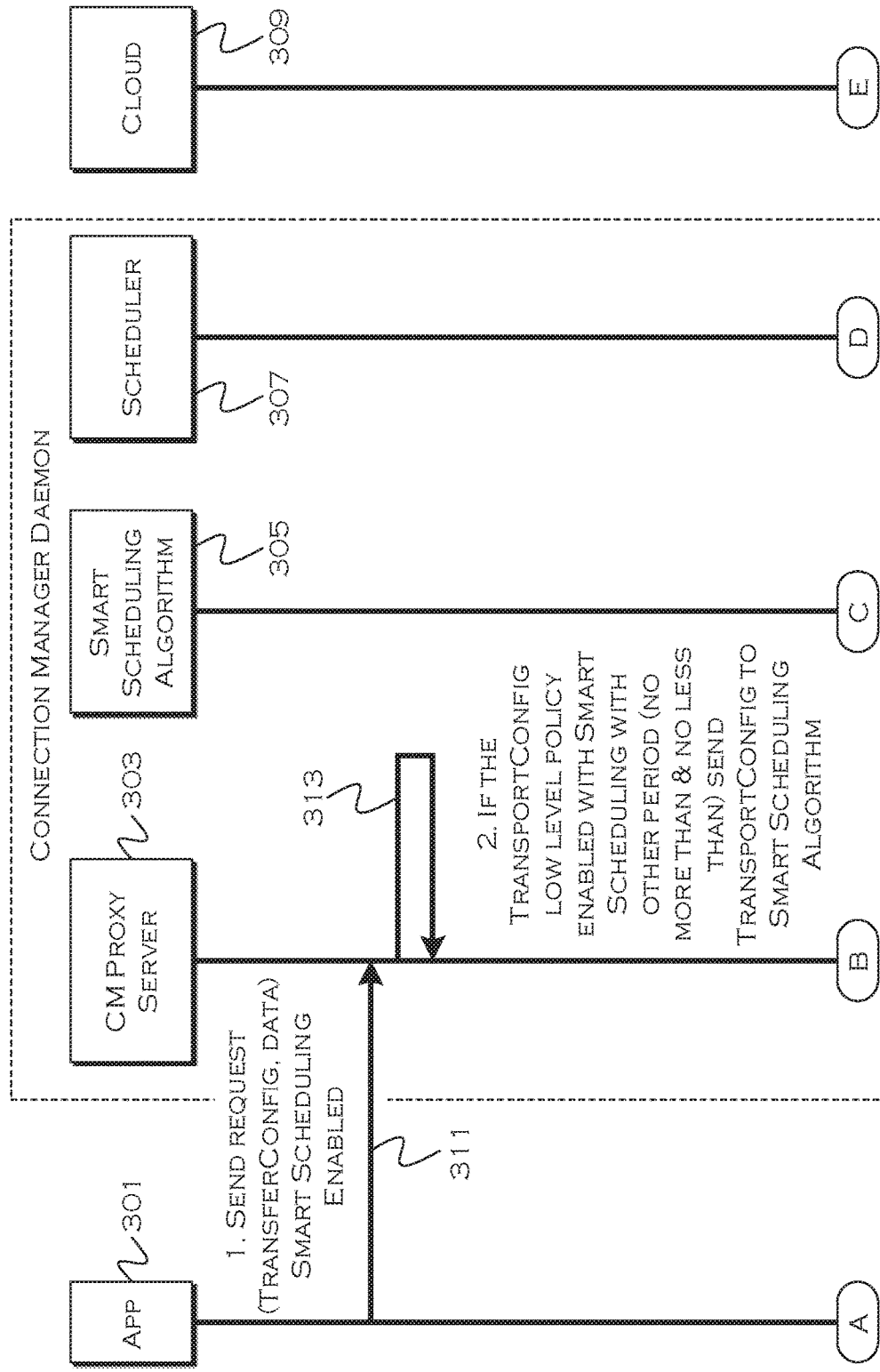
Figure 3B:
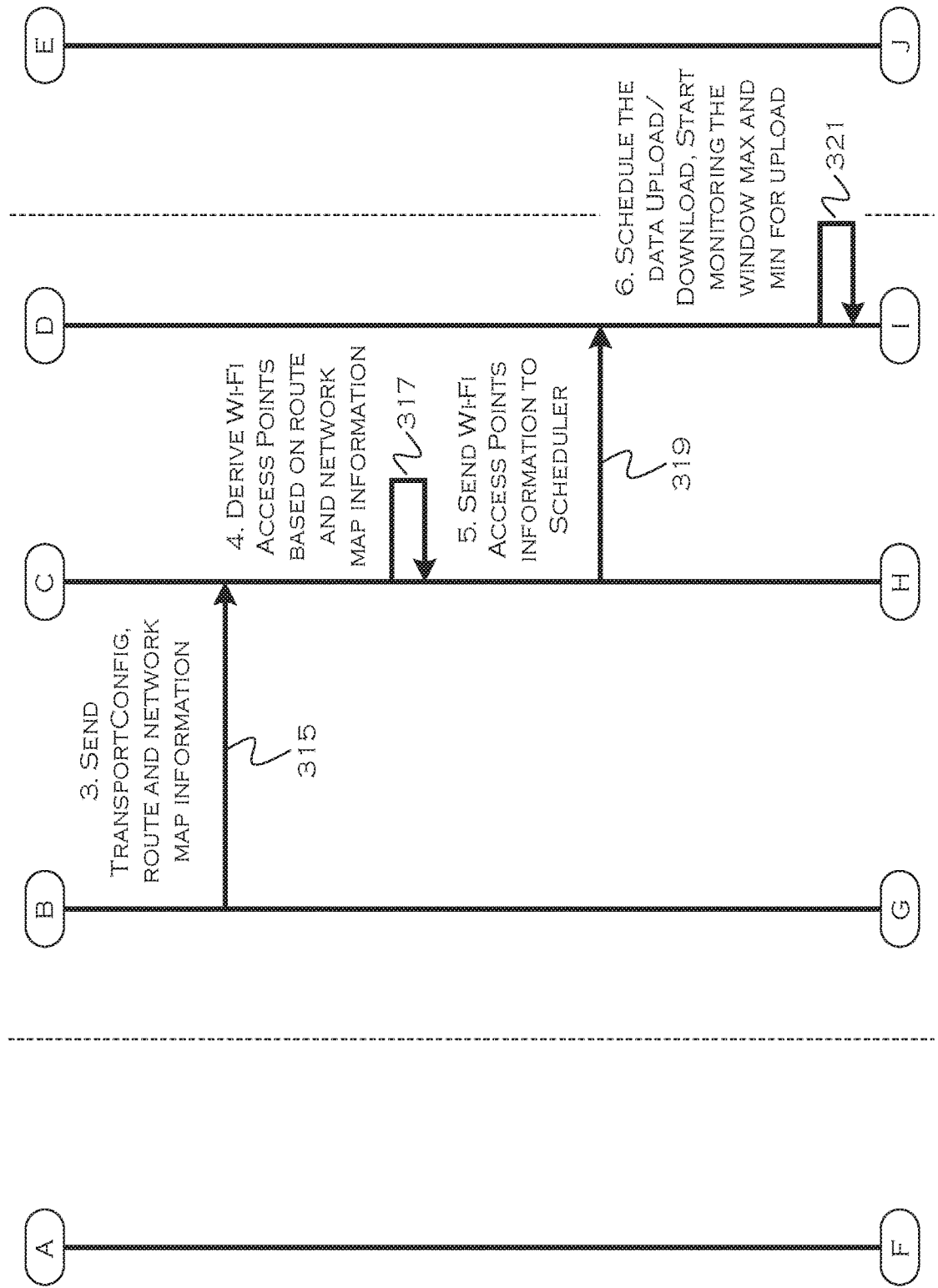

FIGS. 3A-3C show an illustrative example of a smart-scheduling process. In this illustrative example, there are several operating entities, namely, the application 301, a connectivity manager (CM) proxy server 303, a smart scheduling algorithm 305, a scheduler 307 and the cloud 309.

The application will generate requests that involve sending or receiving data to/from a remote source. The application sends the request 311 to the CM proxy server 303. In this example, the request includes a transfer configuration and the data to be sent, and denotes that smart scheduling is enabled. The transfer configuration specifies any limitations or preferences on data transfer, and any parameters to be optimized. An exemplary transport configuration is shown below:

```
Transport Config {
  Smart_Scheduling {TRUE, FALSE}
  Limiting_Window {NO MORE THAN=#BYTES/HOUR OR
MESSAGES/HOUR; NO LESS THAN=#BYTES/HOUR OR
MESSAGES/HOUR}
    Optimized_Parameter{COST, TIME, ENERGY}
    Network_Failover_Enable{TRUE, FALSE}
  }
```

In the preceding, the Smart_Scheduling variable can be set to true or false, denoting whether smart scheduling is desired. If smart scheduling is not desired, the process may attempt to utilize any currently available connections to meet the other constraints, or may simply utilize any available connection that exists to complete the request.

The Limiting_Window specifies what types of data transfer constraints (bytes or messages per hour) set an upper and lower bound. Different communication protocols provide different levels of service, and may also provide different cost levels based on the particular protocol. The system will attempt to utilize available communication protocols that meet the desired service level specified by the Limiting_Window.

The Optimized_Parameter specifies which parameter of data transfer is preferably optimized for a particular request. In this example, the choices are cost, time and energy, but other parameters could also be specified. If cost is the optimized parameter, the process could wait until a free network protocol is available, or use the least-cost option currently available. If time is the optimized parameter, the process could use the fastest option available, regardless of cost. If energy is the optimized parameter, the process could use the lowest-energy form of transfer. Multiple parameters could also define other optimization scenarios as well (e.g., no more than $X/MB and complete the transfer in no less than 5 mins from the request, ranking time ahead of cost if options are available that meets one constraint but not the other).

The Network_Failover_Enable parameter can be set to true or false, specifying whether it is desired to enable a primary sub-net for failover purposes, if the preferred transfer connection fails. For example, if the transport configuration is set with smart scheduling to true and optimization to cost and network fail over to true, smart scheduler will try to upload or download data on an unmetered network and if the unmetered network goes out of coverage, it will failover to a metered network. If the failover was set to false, it would try to use unmetered network.

The CM proxy server receives the application request, which determines what constraints are placed on the transfer 313. If the low level policy includes smart scheduling and an applicable window period for a parameter, the process sends the configuration to the smart scheduling algorithm (in other cases, the process may simply begin the transfer).

The CM proxy server then sends 315 the transport configuration, a vehicle route and a known network map (physical map of network locations) to the smart scheduling algorithm 305.

The smart scheduling algorithm uses a current or planned vehicle route, in conjunction with known physical network locations (e.g., access points) to determine locations of available Wi-Fi (and other) access points along the planned route 317. This allows the process to know when the vehicle is likely to encounter a Wi-Fi network, and how long the vehicle is likely to remain in communication with the network. The second consideration can be a best-guess based on, for example, traffic, proximity to access point, known stop signs and stop lights, weather, etc. For example, if a vehicle route passes through the outer fringe of an available Wi-Fi AP signal while traveling on a highway, the algorithm may discount this as a non-available network. On the other hand, if there is stop-and-go traffic on the highway, the vehicle may obtain 1-2 minutes of utilizable AP time for that access point, so the algorithm may consider the point as usable (but less usable than other better options, for example).

For each network along a route, the process can determine where the network exists (correlating to the route) and for how long the vehicle may be in communication with the network. The process can also determine network types for each network (Wi-Fi, BT, DSRC, etc.). Determining how long a vehicle may be in contact can be based on traffic, weather, traffic controls (lights, signs), etc.

The smart scheduling algorithm sends 319 information derived about the wireless access points along an upcoming route to the scheduler 307. The scheduler receives the AP data and any transfer constraints, and schedules data transfer 321, while remaining aware of the constraints. Thus, the transfer may be scheduled based on known future proximity to upcoming access points which also provide the opportunity to meet the other specified constraints. At the appropriate time, the scheduler sends 323 the data payload to the cloud 309.

If the data transfer is not completed within a specified minimum time, the scheduler generates 325 a notification, which the scheduler sends 327 to the application as a failure. The same can be true for other constraints that are not met (e.g., no free networks encountered or even available). Some requests can specify that if the parameters cannot be met, the transfer should continue using any available resources, in other instances the application may restructure the request, bearing in mind that the previous parameters were not met. If the use of a primary sub-net is specified as permitted, then even when the parameters cannot be fully met or met at all, the primary sub-net may be usable to complete the transfer (preventing complete failure).

Figure 4:
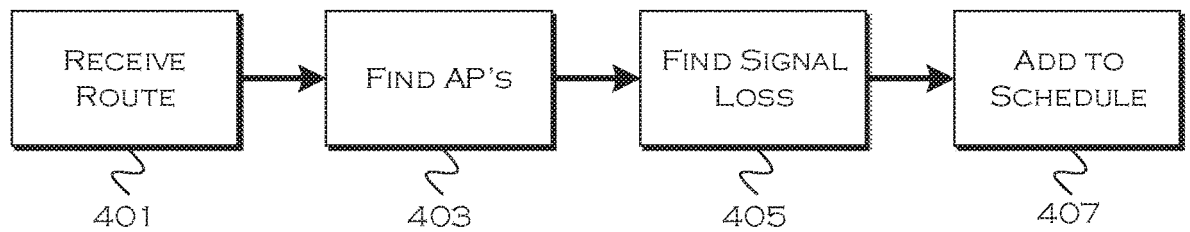
FIG. 4 shows an illustrative process for signal-loss planning.

FIG. 4 shows an illustrative process for signal-loss planning. Just as with planning a route that includes known APs, a vehicle may be traveling along a route where even cellular signals are known to be unavailable. Accordingly, if the scheduling algorithm is planning a route and assuming that a primary cellular sub-net will pick up the slack if an expected transfer using a Wi-Fi AP is not completed, the process may need to know where even the cellular sub-net is likely to fail.

In this example, the process receives the known or predicted route 401 and finds the locations of known Access Points 403. This is in accordance with the previously described scheduling process, which identifies the APs as usable APs. The process, in this instance, also finds locations along the route where cellular service dissipates or degrades to an unacceptable level, whereby data transfer cannot be reliably completed 405. The process also adds these areas to a transfer schedule. These areas indicate areas where fallback to the primary cellular sub-net is not likely to be an option, which can allow the scheduler to adjust the schedule to accommodate the fact that a transfer not completed before the vehicle arrives at the dead zone will likely need to be retried at a later point in time, following the dead zone.

Figure 5:
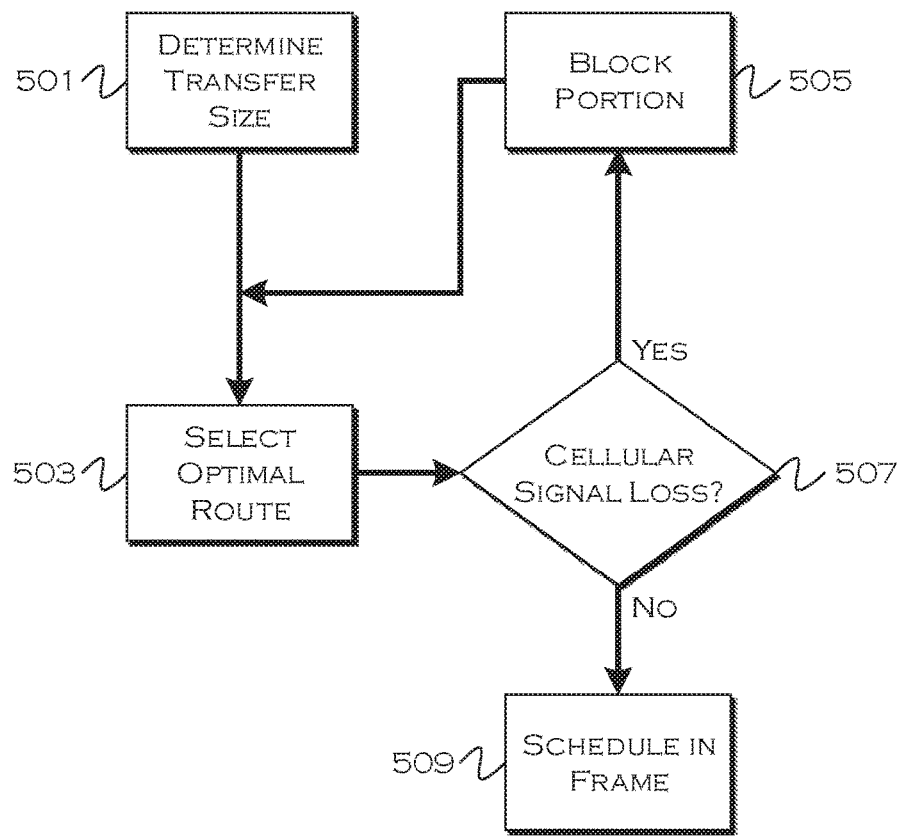
FIG. 5 shows an illustrative process for smart data transfer scheduling to accommodate dead zones.

FIG. 5 shows an illustrative process for smart data transfer scheduling to accommodate dead zones. In this example, the process determines the size of the data payload 501 and selects an optimal time frame (or location frame) along a route 503 to execute the transfer process. Since, in this example, the process also knows when cellular signal loss occurs, the process may determine if any of the selected time-frames or location-frames correspond to expected loss of cellular (or other primary sub-net) signals 507.

Since the preceding condition indicates that the primary sub-net will not likely be available, the process may block that portion of the route (or timeframe) from consideration 505 and then attempt to reschedule the transfer within the new constraints (excluding areas where the primary subnet is not available; note, a sub-net can also be referred to as a sub-flow). If there are no dead zones that correspond to selected time or location windows, the process may schedule the transfer(s) for the optimal windows as determined by the selection process.

Through the use of multi-part transfer protocols and a primary subnet, efficient, reliable data transfer can be achieved. Smart scheduling allows the process to select preferred time or location windows for data transfer, allowing data transfer to occur subject to a variety of transfer constraints. A reliable primary sub-net can help ensure that even if the data transfer does not fully occur within the specified constraints and corresponding designated transfer window, the transfer still can optionally be completed without having to retry the entire transfer again. A request can even go so far as to specify which portion of the request (as a total size or percentage, for example) can be acceptably completed using the backup primary sub-net if the preferred network fails or is lost.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a processor configured to:
receive a data transfer request including a data transfer constraint;
receive a vehicle route;
responsive to receiving the route, determine wireless network availability along the route based on known wireless network locations;
determine a route window, prior to reaching the route window, where wireless network availability indicates that a first wireless network is available that meets the data transfer constraint, the route window being a portion of the route, less than the whole route, representing an area of network coverage covered by the first wireless network; and
schedule data transfer to occur during the route window based on the vehicle reaching a geographic location along the route corresponding to the determined route window.

2. The system of claim 1, wherein the data transfer constraint includes a duration constraint.

3. The system of claim 1, wherein the data transfer constraint includes a cost constraint.

4. The system of claim 1, wherein the data transfer constraint includes an energy usage constraint.

5. The system of claim 1, wherein the request includes an indicator of whether smart scheduling is desired, and wherein the determining wireless network availability, determining the route window and scheduling the data transfer are done responsive to the indicator indicating that smart scheduling is desired.

6. The system of claim 1, wherein the route window is specified as coordinates.

7. The system of claim 1, wherein the route window is specified as time.

8. The system of claim 1, wherein determining the wireless network availability includes determining a type of available wireless network.

9. The system of claim 1, wherein determining the wireless network availability includes determining a projected amount of time for which the wireless network will be available.

10. The system of claim 9, wherein determining the projected amount of time for which the wireless network will be available is based on present or projected traffic.

11. The system of claim 9, wherein determining the projected amount of time for which the wireless network will be available is based on present or projected weather conditions.

12. The system of claim 9, wherein determining the projected amount of time for which the wireless network will be available is based on traffic controls.

13. The system of claim 1, wherein the processor is further configured to provide a primary subnet to serve as a backup during data transfer if a preferred network connection is not available long enough during the route window to complete a transfer.

14. The system of claim 13, wherein the primary subnet is used in concert with the preferred network connection to speed up a data transfer.

15. The system of claim 13, wherein the request includes an indicator as to whether or not it is permissible to use the primary subnet.

16. The system of claim 1, wherein the constraint includes a parameter specifying a limitation on aggregate data transfer.

17. The system of claim 16, wherein the limitation bounds data transfer based on bytes transferred over a time period.

18. The system of claim 16, wherein the limitation bounds data transfer based on number of messages transferred over a time period.

19. A computer-implemented method comprising:
responsive to receipt of a data transfer instruction, including a data transfer constraint, and a route, determining a location of one or more known wireless networks overlapping a portion of the route less than the whole route;
determining which of the one or more known wireless networks are usable to provide data transfer, according to the instruction, which also meets the data transfer constraint, prior to reaching the determined one or more known wireless networks; and scheduling data transfer to occur while a vehicle is within a projected range, along the route, of at least one of the one or more known wireless networks determined to be usable to provide data transfer and meet the data transfer constraint.

\* \* \* \* \*